(12) United States Patent
Chapman

(10) Patent No.: US 10,999,466 B1
(45) Date of Patent: May 4, 2021

(54) IDENTIFYING ORIGINAL AND COPY USING ULTRAVIOLET LIGHT TO REVEAL HIDDEN SECURITY PRINTING FEATURES

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/928,055

(22) Filed: Jul. 14, 2020

(51) Int. Cl.
*H04N 1/00* (2006.01)
*H04N 1/04* (2006.01)
*H04N 1/32* (2006.01)

(52) U.S. Cl.
CPC .......... *H04N 1/32293* (2013.01); *H04N 1/04* (2013.01); *H04N 1/32352* (2013.01); *H04N 2201/3271* (2013.01)

(58) Field of Classification Search
CPC .. H04N 1/32293; H04N 1/04; H04N 1/32352; H04N 2201/3271
See application file for complete search history.

(56) References Cited

U.S. PATENT DOCUMENTS

| | | | |
|---|---|---|---|
| 7,966,267 B2 | 6/2011 | Auslander et al. | |
| 8,405,882 B2* | 3/2013 | Cole | H04N 1/00883 358/3.28 |
| 8,743,425 B2 | 6/2014 | Simske et al. | |
| 8,962,065 B2* | 2/2015 | Dalal | B42D 25/29 427/7 |
| 9,092,858 B2 | 7/2015 | Simske et al. | |
| 10,284,740 B1* | 5/2019 | Chapman | B41M 3/148 |
| 10,582,078 B1* | 3/2020 | Chapman | H04N 1/0087 |
| 2006/0230273 A1* | 10/2006 | Crichton | G03G 21/043 713/176 |
| 2007/0241554 A1* | 10/2007 | Wicker | H04N 1/32144 283/93 |
| 2007/0262579 A1* | 11/2007 | Bala | B41M 3/144 283/92 |

(Continued)

FOREIGN PATENT DOCUMENTS

WO 2010147951 A1 12/2010

OTHER PUBLICATIONS https://forums.adobe.com/thread/1559820, Copyright Adobe Community, Retrieved on Oct. 25, 2017, pp. 1-3.

*Primary Examiner* — Ted W Barnes
(74) *Attorney, Agent, or Firm* — Gibb & Riley, LLC

(57) ABSTRACT

A first pattern and the second pattern in an original include relatively lighter markings within a relatively darker background. The first pattern differs from the second pattern by including non-printing patches between the relatively lighter markings. When exposed to ultraviolet light, the underlying print media fluoresces in response to the ultraviolet light at the non-printing patches, revealing hidden security printing features. When a scanned image is printed on a second sheet of print media to produce a copy of the original, the copy maintains distinct markings at locations where the relatively lighter markings and the non-printing patches appear because the spacing interval of the relatively lighter markings and the non-printing patches is at or above the minimum resolution of the scanner. Thus, when the original and the copy are exposed to ultraviolet light, both fluoresce the ultraviolet light where the non-printing patches appear in the original.

20 Claims, 9 Drawing Sheets

(56) References Cited

U.S. PATENT DOCUMENTS

| | | | |
|---|---|---|---|
| 2007/0264476 A1* | 11/2007 | Bala | B41M 3/144 |
| | | | 428/195.1 |
| 2007/0268511 A1* | 11/2007 | Crichton | B42D 25/485 |
| | | | 358/1.14 |
| 2009/0122349 A1* | 5/2009 | Bala | H04N 1/32256 |
| | | | 358/3.28 |
| 2009/0180152 A1* | 7/2009 | Bala | H04N 1/4055 |
| | | | 358/3.28 |
| 2009/0201321 A1* | 8/2009 | Halfyard | B41J 3/546 |
| | | | 347/2 |
| 2009/0237682 A1* | 9/2009 | Bala | H04N 1/6033 |
| | | | 358/1.9 |
| 2010/0040282 A1* | 2/2010 | Bala | G06T 7/155 |
| | | | 382/165 |
| 2010/0150433 A1* | 6/2010 | Wang | H04N 1/00864 |
| | | | 382/162 |
| 2010/0157377 A1* | 6/2010 | Zhao | B42D 25/333 |
| | | | 358/3.28 |
| 2010/0239831 A1* | 9/2010 | Eschbach | B42D 25/29 |
| | | | 428/199 |
| 2011/0298204 A1* | 12/2011 | Eschbach | B42D 25/29 |
| | | | 283/67 |
| 2013/0215472 A1* | 8/2013 | Rossier | H04N 1/4055 |
| | | | 358/3.06 |
| 2013/0300101 A1* | 11/2013 | Wicker | G07D 7/1205 |
| | | | 283/67 |
| 2013/0306737 A1* | 11/2013 | Freeman | G06K 19/06037 |
| | | | 235/488 |
| 2014/0339808 A1* | 11/2014 | Pawlik | B42D 25/355 |
| | | | 283/85 |
| 2019/0351689 A1* | 11/2019 | Chapman | G03G 21/04 |

* cited by examiner

IDENTIFYING ORIGINAL AND COPY USING ULTRAVIOLET LIGHT TO REVEAL HIDDEN SECURITY PRINTING FEATURES

BACKGROUND

Systems and methods herein generally relate to document security and more specifically to identification of an original item and a copy of the original item using ultraviolet light which reveals hidden security features.

Security printing features are elements of the document that may not appear in a copy but may appear in the original, which allows the holder to recognize that they possess the original document. For example, the security printing features may reveal "valid" or "original" in the original under special lighting conditions or when viewed with filters. Such printing is a popular anti-counterfeiting and anti-forging method to protect valuable documents such as prescriptions and concert tickets. In one example, pantographs, which may for example appear gray on the copy and show the word "valid" in the original are printed in the original and such pantographs will not transfer to copies, so as to indicate that the copies are not the original. In other examples, the pantographs appear grey in the original and show the word "void" in the copy.

Additionally, some florescent security features use special ultraviolet (UV) inks because such inks are not reproduced during copying, again distinguishing an original from copies. Such hidden marks printed using special UV inks are generally invisible unless viewed under UV light. Such inks can be expensive, limiting their usefulness.

SUMMARY

Methods herein determine the minimum scanner resolution of a scanner, set a first spacing interval at or above the minimum scanner resolution, and establish a first pattern and a second pattern that include relatively lighter markings within a relatively darker background, where the relatively lighter markings are established to appear at or above the first spacing interval. The relatively darker background is the same in the first pattern and the second pattern.

The first pattern is established to differ from the second pattern by having non-printing patches between the relatively lighter markings. The second pattern is established to not include such non-printing patches. The non-printing patches can be the same size as the relatively lighter markings. Also, these methods add the first pattern and the second pattern to a document and print the document as an original on a first sheet of print media using a printer.

When the original is scanned to produce a scanned image using a scanner (the scanner is capable of detecting patterns of markings at the first spacing interval) the scanning causing the scanned image to distinguish the relatively lighter markings and the non-printing patches from the relatively darker background. Therefore, when the scanned image is printed on a second sheet of print media to produce a copy of the original, the copy maintains distinct markings at locations corresponding to where the relatively lighter markings and the non-printing patches appear in the original.

When the original is exposed to ultraviolet light, the exposed portions of the first sheet of print media fluoresce in response to the ultraviolet light (in locations where the non-printing patches are located in the original); similarly, when the copy is exposed to ultraviolet light, the sheet forming the copy also fluoresces in response to the ultraviolet light where the non-printing patches appear in the original. More specifically, the ultraviolet light fluoresces where the non-printing patches appear in the original and the copy to cause the first pattern and the second pattern to appear different from one another to an observer (when exposed to the ultraviolet light). Thus, locations of the first pattern and the second pattern in the copy appear differently to an observer when the copy is exposed to the ultraviolet light.

The process of establishing the first pattern can optionally add dark marking patches to the first pattern, potentially in the same pattern as the non-printing patches, but offset from the non-printing patches. Such dark marking patches are relatively darker than the relatively darker background. The relatively lighter markings have a color more similar to the sheets of media used to print the original and the copy, relative to the relatively darker background. Therefore, when exposed to white light, the relatively lighter markings appear the same as the non-printing patches to an observer.

Various systems herein include, among other components, a printer and a scanner operatively (directly or indirectly) connected to a processor. The scanner is configured to scan sheets output by the printer, etc. The processor is configured to control the printer to print an original by printing a first pattern within a second pattern on a first sheet of print media. The first pattern and the second pattern include relatively lighter markings within a relatively darker background. The relatively lighter markings occur at a first spacing interval, and the first pattern differs from the second pattern by including non-printing patches between the relatively lighter markings. These non-printing patches are not included in the second pattern. These non-printing patches can be the same size as the relatively lighter markings.

When the original is scanned to produce a scanned image, the scanner is capable of detecting patterns of markings at the first spacing interval. Therefore, this scanning causes the scanned image to distinguish the relatively lighter markings and the non-printing patches from the relatively darker background. Because of this, when the scanned image is printed on a second sheet of print media to produce a copy of the original using a printer, the copy also maintains distinct markings at locations corresponding to where the relatively lighter markings and the non-printing patches appear in the original.

Further, when the original is exposed to ultraviolet light, the first sheet of print media fluoresces the ultraviolet light in locations where the non-printing patches are located in the original. Similarly, when the copy is exposed to ultraviolet light, the copy fluoresces the ultraviolet light where the non-printing patches appear in the original (possibly to a slightly lesser extent than the original) again because the copy also maintains distinct markings at locations corresponding to where the relatively lighter markings and the non-printing patches appear in the original.

More specifically, the ultraviolet light fluoresces from locations of the first sheet of print media where the non-printing patches appear in the original, and this causes the first pattern and the second pattern to appear different from one another to an observer when exposed to the ultraviolet light. Similarly, the locations of the first pattern and the second pattern in the copy appear differently to an observer when the copy is exposed to the ultraviolet light (again because the copy maintains distinct markings at locations corresponding to where the relatively lighter markings and the non-printing patches appear in the original).

The process of establishing the first pattern can include adding dark marking patches to the first pattern, potentially in the same pattern as the non-printing patches, but where the dark marking patches are offset from the non-printing patches. Also, the dark marking patches are relatively darker than the relatively darker background. Further, the relatively lighter markings have a color more similar to sheets of media used to print the original and the copy, relative to the relatively darker background. Because of this, when exposed to the white light, the relatively lighter markings appear the same as the non-printing patches to an observer.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

Figure 1:
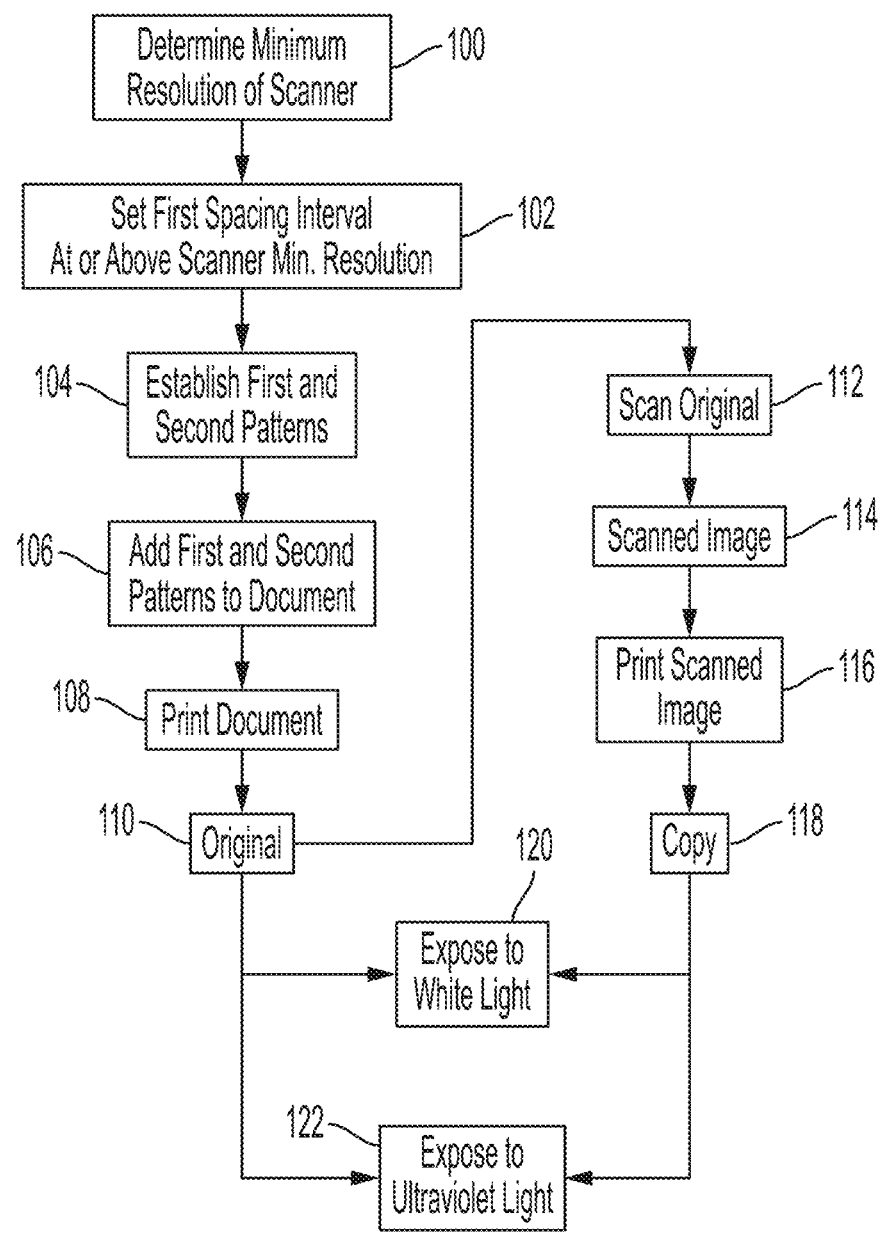
FIG. 1 is a flow diagram of various methods herein.

As noted above, many security printing effects either are destroyed or degraded by scanning or copying. This is often desired to be able to distinguish the original from the copy. A smaller subset of documents present cases where a copy or the original can be used and hence it is desired to have a security effect survive a copy or scan. Example documents are Veterans DD 214's and social security cards.

The embodiments herein can use any form of pantograph, metameric pair, or other security printing feature to confirm to the holder that they possess a copy that is based on the original, and such may be easily seen by a human without magnification (but in special lighting conditions). Specifically, the methods and systems herein utilize a metameric pair with one blocking ultraviolet (UV) light and the other not blocking (or only partially blocking) ultraviolet light. Herein, non-blocking areas that use the florescent properties of the underlying print media are created with small non-blocking holes in the inks or toners used elsewhere in the patterns. These holes are designed large enough that when copied, the holes are not filled in on the copy and are therefore fully reproduced in the copy, allowing the fluorescence seen in the original to also be seen in the copy under ultraviolet light.

The design goal of a metameric pair for fluorescence is for the security printing to appear to be about the same color as the background, and therefore be hidden, under white light (e.g., office lighting); but for the security printing to easily appear under ultraviolet light. Therefore, the security printing (e.g., text and/or other graphics) are mostly invisible under standard, normal office illumination, but are visible under ultraviolet illumination. Thus, when the original and a copy are viewed by a human user (without magnification) or by a camera under ultraviolet light, the original and the copy will both reveal the security printing.

The security features herein can also optionally distinguish a genuine copy (a copy of the original that lacks any alteration) from an altered copy because, in some options herein, the security printing can be included as a regular uninterrupted pattern in all areas of the original and copy. Because of this regular uninterrupted pattern of the hidden security feature, any physical or electronic "cutting and pasting" that substitutes a portion from a document other than the original into the copy will disturb the regular uninterrupted pattern of the hidden security feature. For example, if one erased the name and put a new name in the image in an altered copy, the uninterrupted patterns would not be fully recreated near the name and to show that the copy was altered from the original. Additionally, the hidden security feature can include data from the original (e.g., a number, name, etc., from the original) allowing one to match the data in the hidden security feature with the non-hidden data on the copy. Such a disturbance in the regular uninterrupted pattern of the hidden security feature will reveal that the copy has been altered (relative to the original) when the copy is viewed under ultraviolet light, and thereby demonstrate that the copy is no longer genuine, but is instead an altered copy.

Further, the methods and systems herein produce this ultraviolet light-only detectable security printing feature using standard copy paper, standard printing processes, and standard inks and toners; making such available to all color printers, and this avoids the higher costs and rarity of specialty printers, specialty print processes, specialty printing inks or print medias, etc. For purposes herein such "standard" items include, for example, standard print media (e.g., bulk copy paper that is generally provided in reams or on rolls), standard inks and toners that lack enhanced fluorescence properties (e.g., red, green, blue (RGB), (cyan, magenta, yellow, black (CMYK), cyan, magenta, yellow, black, red, green, blue (CMTKRGB) etc.), and standard printers lacking capabilities to add sophisticated microprinting, hidden patterns, etc.

With methods and systems herein, there is a difference between the patterns of such relatively lighter markings (e.g., first and second patterns), and this forms the hidden security printing pattern that can be seen in the original and copy with ultraviolet light. The relatively lighter markings are small enough to appear as a uniform shade on the original and copy in white light, preventing the hidden pattern from appearing to an observer (or camera) viewing the original without magnification in non-UV lighting conditions.

Herein, the first pattern is established to differ from the second pattern by having non-printing patches spaced between the relatively lighter markings; however, the second pattern is established to not include these non-printing patches. The non-printing patches are areas where no printing exists and where the underlying print media is exposed and can fluoresce light. The difference between the first and second patterns (e.g., specifically the non-printing patches in the first pattern) forms a metameric mark or user message (e.g., text or other marks) that can be recognized by the observer or camera under ultraviolet lighting conditions without magnification.

These non-printing patches can be the same size as the relatively lighter markings and the print media color is close to the color of the relatively lighter markings, making the non-printing patches and the relatively lighter markings indistinguishable under white light. The first pattern and the second pattern are added to a document, and the document is printed as the "original" on a first sheet of print media using a printer.

More specifically, herein the relatively lighter markings are printed within a darker background (for reference herein, darker colors are relatively closer in appearance to black, while lighter colors are relatively closer in appearance to white). The relatively lighter markings are printed using a lighter color relative to the darker background, and the relatively lighter markings and non-printing patches are small enough and closely spaced enough to not appear distinct within the darker background to an observer or camera viewing the original without magnification. Instead, these relatively lighter markings and non-printing patches merely lighten the shade of the darker background to such a viewer. In other words, the darker background and the closely spaced relatively lighter markings and non-printing patches are small enough to merge together and appear as a uniform shaded area of the original to an observer or camera viewing the original in white light without magnification.

In order to accomplish the foregoing, the methods herein rely upon the scanner to not function as a filter, in view of the fact that scanners are unable to detect printed marks (relatively lighter markings) that are spaced below the scanner's minimum resolution (e.g., below the scanners MTF (modulation transfer function) or maximum frequency). In view of this, and to prevent the scanner from filtering out the hidden markings, the relatively lighter markings and non-printing patches are established/generated by methods and systems herein to be spaced at or above the scanner's minimum resolution (or at or above the scanners MTF).

Because the lighter markings and non-printing patches are sized and spaced at or above the scanner's minimum resolution, the scanner does distinguish these relatively lighter markings from the darker background, and these relatively lighter markings print as distinct features within the darker background on a copy of the original. Therefore, the copying of the original leaves exposed areas of the underlying print media in the area of the first and second patterns, allowing light reflection from the underlying print media.

Specifically, methods herein determine the minimum scanner resolution of a scanner that will be used in a copy operation for the original, set a first spacing interval at or above the minimum scanner resolution, and establish/generate first and second patterns that include the relatively lighter markings within the relatively darker background, where the relatively lighter markings are established to appear at the first spacing interval (e.g., an above-minimum scanner resolution spacing interval). The relatively darker background is the same beneath the first and second patterns (e.g., the relatively darker background has the same color, pattern shape, pattern frequency, etc., in the first and second patterns).

When the original is scanned to produce a scanned image using such a scanner (again, the scanner is capable of detecting patterns of markings that are above a minimum scanner resolution) the scanning allows the copied image to distinguish the relatively lighter markings and the non-printing patches from the relatively darker background. Therefore, when the scanned image is printed on a second sheet of print media to produce the copy of the original (using a printer) the copy includes the same distinct markings at locations corresponding to where the relatively lighter markings and the non-printing patches appear in the original.

When the original and the copy are exposed to ultraviolet light, both sheets fluoresce the ultraviolet light in locations where the non-printing patches (exposed areas of the underlying sheet) are located because standard copy media has some level of fluorescence and will produce some amount of fluorescence effect when exposed to ultraviolet light. Thus, the underlying sheet of print media fluoresces where the non-printing patches appear in the original and copy to cause the first pattern and the second pattern to appear different from one another to an observer or camera when exposed to the ultraviolet light.

In other words, locations where the original lacks markings can be thought of as "holes" or missing relatively lighter markings in the otherwise continuous area of the relatively darker background because no marking material (ink or toner) will cover the first sheet of print media at the non-printing patches. This allows the print media to reflect/fluoresce the ultraviolet light only where such non-printing patches exist (within the region covered by the relatively darker background).

As is understood by those ordinarily skilled in the art, "white light" generally means human-visible light such as daylight, artificial light sources (indoor/outdoor lights, mobile light sources), and is different from infrared light, ultraviolet light, etc.). There is a distinction between white light and ultraviolet light. White light contains most (or all) human-visible colors, while ultraviolet light includes light wavelengths shorter than those within the spectrum of human-visible light and contains a limited number (or only one) human-visible color (e.g., violet). Therefore, white light causes different colors to reflect from the original and the copy, while ultraviolet causes a single color to reflect. In one example, a typical UV (black) light is a single wavelength around 315-400 nm which is near the range between visible and invisible and is usually seen as a dark violet. When ultraviolet is shined on white paper it fluoresces and it reflects back a higher wavelength.

The ultraviolet light will mostly show just light and dark areas in a violet color to humans, without much distinction between different colors (other than some difference between light and dark colors of ink/toner). However, the florescent characteristic of print media will fluoresce in response to ultraviolet light much more than ink or toner (because standard inks and toners do not contain large amounts of florescent material). For example, print media can have 10×, 50×, 100×, etc., the fluorescence to ultraviolet light relative to standard inks and toners (e.g., RGB, CMYK, etc.). This causes exposed areas of print media to appear much brighter, relative to areas of the print media that are covered with ink or toner, in response to ultraviolet light. Therefore, the difference between the first pattern which has exposed areas of print media (non-printing patches); and the second pattern, which does not have exposed areas of the underlying print media in the same location, is easily seen when the original and copy are exposed to ultraviolet light because the non-printing patches in the first pattern fluoresce greatly relative to the ink/toner in non-missing relatively lighter markings the second pattern.

The relatively lighter markings have a color more similar to the sheets of media used to print the original and the copy, relative to the relatively darker background. Therefore, when the original and copy are exposed to white light, the relatively lighter markings appear the same as the non-printing patches in the original and copy to an observer or camera (and all such items merge together when viewed to merely lighten the overall appearance of the relatively darker background). However, to further aid in matching the appearance of the relatively lighter markings and the exposed print media showing through the non-printing patches, the process of establishing the first pattern can include adding darker marks to the first pattern that are arbitrarily referred to herein as "dark marking patches".

These dark marking patches can have the same pattern that matches the pattern of the non-printing patches. However, such dark marking patches are offset from (uniformly and consistently spaced from) the non-printing patches so as to not block the non-printing patches and allow areas of the underlying print media to remain exposed. Therefore, the dark marking patches similarly can be spaced at or above the first spacing interval. There can be, for example, a one-to-one occurrence of the non-printing patches and dark marking patches such that each non-printing patch has a corresponding marking patch that does not block the non-printing patch but is spaced close enough to the non-printing patch to compensate for any color variation the non-printing patch may generate within the first and second patterns.

Such dark marking patches can even be darker than the relatively darker background in order to help compensate for any differences between the color of the underlying print media and the color of the relatively lighter markings. In other words, because of the close proximity of (and the matching spacing patterns of) the dark marking patches and the non-printing patches, the dark marking patches darken the perceived appearance of the very light non-printing patches, without covering the non-printing patches. Therefore, when viewed by an observer or camera under white light and without magnification, the small feature size and close spacing of the relatively lighter markings, the non-printing patches, and the dark marking patches causes all such features to merge together and appear as a consistent, uniform lighting feature within the relatively darker background. Therefore, under white light and without magnification the relatively lighter markings, the non-printing patches, and the dark marking patches do not appear distinct from the relatively darker background, but instead only make the relatively darker background appear a little lighter.

FIG. 1 is flowchart illustrating exemplary methods herein. In item 100 in FIG. 1, these methods determine the minimum scanner resolution of a scanner or class of scanners. Scanning resolution is often measured in generic units such as dots per inch (DPI) or other arbitrary units of measure (DPI will be used in examples herein for ease of discussion, but methods and systems herein are not limited to such a unit of measure). As DPI increases, smaller and smaller features can be recognized by the scanner, allowing the resolution to be smaller and smaller. However, because of limitations of the physical design and electronic componentry within a scanner, as feature sizes decrease at some point a scanner will not be able to distinguish among these features, and this minimum feature size is established as the minimum scanner resolution of a specific scanner (again, which identified using an arbitrary unit of measure, such as DPI).

This step 100 can specifically identify the scanning resolution of a specific scanner or copier, or can identify groups, classes, brands, or types of scanners. Therefore, the processing in item 100 can be performed by the processor reading the minimum scanning resolution of a specific scanner, can be performed by a user setting the minimum scanning resolution to specific number, etc.

Lower end scanners may scan at resolutions as low as 300, 600, or 900 DPI, while higher end scanners may scan at resolutions that are 2×, 5×, 10×, 100×, etc., that of low-end scanners (e.g., 2400 DPI, 4800 DPI, etc.). One concern with scanning at higher resolutions is that higher resolution scanning produces much larger file sizes. Therefore, the resolution of scanners is generally limited by cost and file size consideration, making it possible to establish the minimum scanner resolution to capture certain classes of scanners (e.g., low and medium end scanners), certain types or brands of scanners, etc., and thereby potentially capture the majority of scanners that might be used to copy an original. Therefore, in one example, a specific minimum scanner resolution could be manually set by the user (e.g., 900 DPI) in item 100 that would capture 90-95% of all possible scanner/copiers. This would allow the security printing feature provided by the systems and methods herein to work with virtually all available, or at least the vast majority of, scanners/copiers.

With this information, in item 102 these methods set a first spacing interval at or above this minimum scanner resolution. Next, in item 104, these methods establish (automatically or manually) first and second patterns that are at or above the first spacing interval. As noted above, the first and second patterns established in item 104 are similar, but distinct. Each of the first and second patterns includes relatively lighter markings within a relatively darker background, and the relatively lighter markings are established to be spaced apart from each other at or above the minimum scanner resolution (the first spacing interval). These relatively lighter markings can be aligned with each other and the relatively darker background can be uniform and can be the same in the first and second patterns.

More specifically, in item 104, the first pattern is established to differ from the second pattern by having non-printing patches removed from the relatively darker background between the relatively lighter markings. In contrast, the second pattern is established in item 104 to not include the non-printing patches (e.g., to keep a continuous, unbroken relatively darker background between all relatively lighter markings). The non-printing patches can be the same or different sizes as the relatively lighter markings. Further, the non-printing patches are spaced apart from each other at or above the first spacing interval.

As noted above, to further aid in matching the appearance of the relatively lighter markings and the exposed print media showing through the non-printing patches, the process of establishing the first pattern in item 104, can include darker marks in the first pattern that are referred to herein as dark marking patches. These dark marking patches can be located in the same matching pattern as the non-printing patches. However, such dark marking patches are offset from (uniformly and consistently spaced from) the non-printing patches so as to not block the non-printing patches and allow areas of the underlying print media to remain exposed.

The patterns established in item 104 will eventually be printed and, therefore, while the spacing in the first and second patterns is at or above the first spacing interval, they are also therefore established to be at least the minimum printing resolution of the printer that will print the original. The minimum printing resolution can be specific to a printer, or can be set to include groups, classes, brands, or types of printers.

In order to avoid requiring the use of more expensive and less available specialized printers or exotic print processing or materials, the spacing in the first and second patterns established in item 104 can be set above the minimum printing resolution of a generally available printer; and this allows the first and second patterns to potentially be printed using almost any printer. For example, some lower end commonly available printers print at resolutions of 1200 DPI, 1800 DPI, etc., while higher end printers may print at resolutions that are 2×, 5×, 10×, 100×, etc., of low-end printers (e.g., 4800 DPI, 9600 DPI, etc.). The minimum printing resolution used in item 104 may be set to include the vast majority of available printers, if for example a high percentage of available printers are known to all have printing resolution at or below 1200 DPI, to allow a large percentage of printers to use the security printing feature described herein.

With this, the methods and systems herein generate the first and second patterns to have the relatively lighter markings, non-printing patches, and dark marking patches spaced to allow the features in the patterns to be printed by common printers and distinguishable by common scanners. The embodiments herein are not limited to these amounts and such ranges and values are provided merely as examples to aid in understanding. Therefore, the minimum printing resolution used in item 104 allows the user to specifically include (or exclude) groups, classes, brands, or types of printers that can use the printing security feature described herein.

One exemplary process sequence for generating the spacing of the relatively lighter markings, non-printing patches, and dark marking patches to be equal to or greater than the minimum scanner resolution (to allow detection by a scanner) is set forth here. First, a metameric pair that produces florescence can be created by forming a security feature (text, graphic, etc.) using spaced apart holes that expose the underlying print media within an otherwise opaque area of ink or toner. This security feature is then written in multiple, different sized swatches by varying in size (e.g. from sizes 100% to 10% with a step of 1%, using any arbitrary unit of size measure). These swatches can be printed and viewed by a user under an ultraviolet light to allow the user to verify which size swatches display a florescent watermark under the ultraviolet light. Then the sheet(s) with the swatches are copied and the copy can be similarly viewed under the ultraviolet light to allow the user to determine which swatch sizes in the copy display the florescent watermark. With this, the user can select the first spacing interval to generate the security printing feature that is to be added to all production documents that will include the security printing feature.

Thus, as shown above, the periodic spacing between the relatively lighter markings (and the spacing between the non-printing patches) is set in item 104 at or above the minimum scanner resolution and the minimum printing resolution to allow the first and second patterns to potentially be printed by a high percentage of available printers, while still allowing a high percentage of scanners to recognize the security printing features, and thereby allow the security printing feature to transfer to copies.

Also, as shown in item 106, these methods add the first pattern and the second pattern to a document. After being printed and when viewed without magnification in white light, the first and second patterns appear as a uniformly shaded area of a document. Therefore, the first and second patterns are preferably added to areas of an existing document that have a consistent shading or color; however, such patterns can be usefully added to almost any area of an existing document that contains solid printing (e.g., areas of the existing document that are completely covered by some form of toner, ink, or other marking material).

Steps 104 had 106 are coordinated so that the combination of the relatively lighter markings and the relatively darker background appear the same as the area of the existing document to which the first and second patterns are added (when viewed without magnification in white light). In other words, a document may be prepared separately from the processing of the methods and systems described herein, and items 104 and 106 establish and add the first and second patterns to that existing document without altering the appearance of that existing document when viewed without magnification in white light. Therefore, the methods and systems herein can take an existing document and add the security printing feature to that document without altering the appearance of that existing document in white light, and the only change that occurs through the processing described herein can be observed when the original and copy are viewed under ultraviolet light (where the otherwise hidden security printing feature can provide a message or symbol to the user).

In item 108, these methods print the document as an original on a first sheet of print media using a printer. Again, the spacing of the relatively lighter markings is established in item 104 to be above the minimum printing resolution of the printer that will print the original, and at or above the minimum scanner resolution, potentially allowing any generally available printer to print an effective version of the printing security feature described herein.

More specifically, in item 108, the methods herein print the electronic document on a first sheet of print media using a printer, and as noted above, the printed item that is output is referred to herein as an original 110 for convenience of discussion. Within the printed original 110, the first and second patterns include the relatively lighter markings (relatively lighter markings) within the relatively darker background.

At some point the original 110 may be scanned using a scanner in item 112 to produce a scanned image 114. As noted above, the scanner has a limited resolution, causing the scanner to only detect marks that are large enough and spaced apart enough to be detected by the scanner's minimum resolution (because the scanner's minimum resolution prevents the scanner from detecting markings that are too small or spaced too closely together). Because the size and spacing of the relatively lighter markings is established in item 104 to be at or above the scanner's minimum resolution, the scanner does not filter out the distinction between the relatively lighter markings, the non-printing patches, and the relatively darker background, and thereby maintains the security printing feature in the scan/copy.

As shown in item 116, the scanned image 114 is printed using the same, or a different, printer than was used in item 108 to produce what is referred to herein as a copy 118. Most forms of print media can be used to print the original 110 or the copy 118, and specialized print media is not required (but can be used), and the print media can be copy paper, bond, cardstock, photo paper, plastic, metal, polymers, etc.

As can be seen in item 120, the original 110 and/or the copy 118 can be exposed to white light and observed by an observer or camera without magnification. The relatively lighter markings have a color (e.g., yellow, white, etc.) that is more similar to the sheets of media used to print the original than other darker colors. Therefore, when the original 110 and copy 118 are exposed to white light in item 120, the relatively lighter markings are substantially indistinguishable from the non-printing patches in the original and copy (to an observer or camera without magnification).

As noted above, the small feature size and close spacing of the relatively lighter markings, the non-printing patches, and the dark marking patches cause all such features to merge together and appear as a consistent, uniform lightening feature within the relatively darker background to an observer or camera without magnification. Indeed, because they are too small to be easily seen (under white light and without magnification) the relatively lighter markings, the non-printing patches, and the dark marking patches do not appear distinct from the relatively darker background, but instead such items combine to only make the relatively darker background appear a little lighter.

As can be seen in item 122, the original 110 and/or the copy 118 can be exposed to ultraviolet light and observed by an observer or camera without (or possibly with) magnification. Any magnification needs to be limited so that the text of the security feature can be read. When the original 110 and the copy 118 are exposed to ultraviolet light in item 122, the inks and toners of the relatively darker background and the relatively lighter markings appear to be the same color (both equally fluoresce violet lightly or dimly). However, the portions of the print media exposed in the non-printing patches fluoresce (phosphoresce) much more brightly (e.g., 10×, 100×, 1000× more brightly) than the inks and toners to an observer, brightly displaying the pattern of the non-printing patches and thereby displaying the message or design feature (e.g., the security printing feature).

Figure 2A:
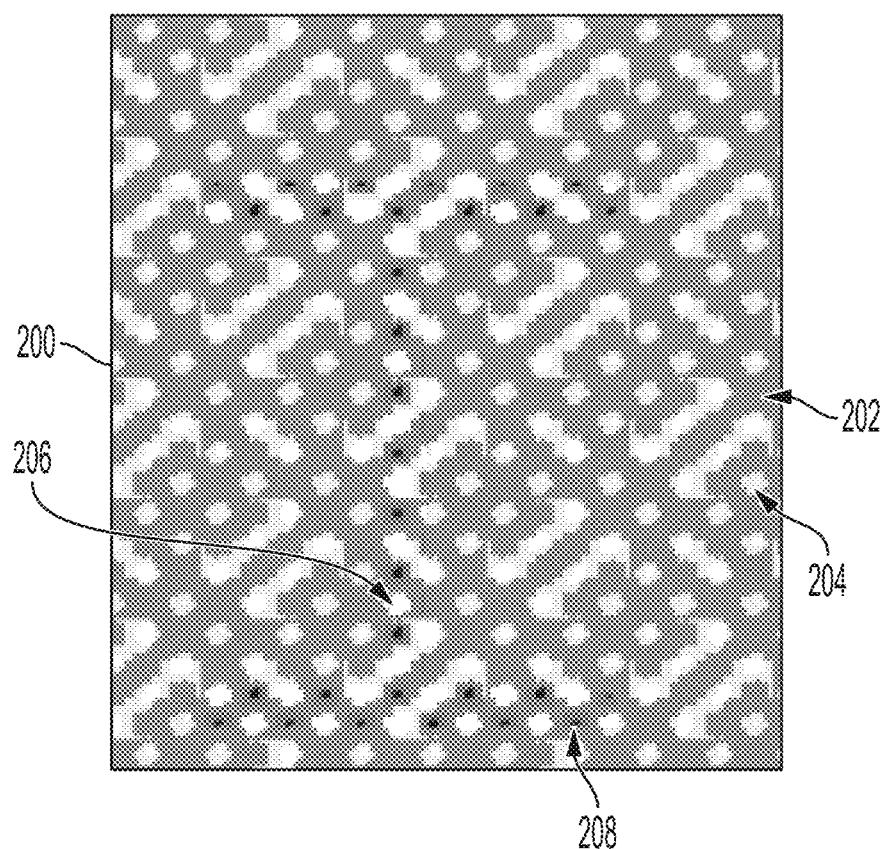
FIG. 2A-5C are schematic diagrams illustrating printing performed herein.

This is also shown schematically in FIGS. 2A-4C. FIG. 2A illustrates one non-limited example of an original 200 printed on a first sheet of print media. More specifically, FIG. 2A illustrates printed relatively lighter markings 204, non-printing patches 206, and much darker printed dark marking patches 208 within a printed darker background 202. Again, the relatively lighter markings 204 are printed using a lighter color relative to the darker background 202, and the dark marking patches 208 are relatively darker than even the darker background 202. Also, the non-printing patches 206 do not contain any toner or ink and allow the underlying print media to be exposed and to fluoresce when exposed to ultraviolet light.

As shown in FIG. 2A, the relatively lighter markings 204 can be different shapes (e.g., the same or differently sized/shaped patches, dots, elongated shapes, etc.) and can be arranged randomly and/or can be aligned along straight lines. As discussed above, the systems and methods herein can automatically generate or establish the first and second patterns to have the relatively lighter markings 204 spaced from each other by a distance that is at or above the minimum scanner resolution and the minimum printer resolution.

Figure 2B:
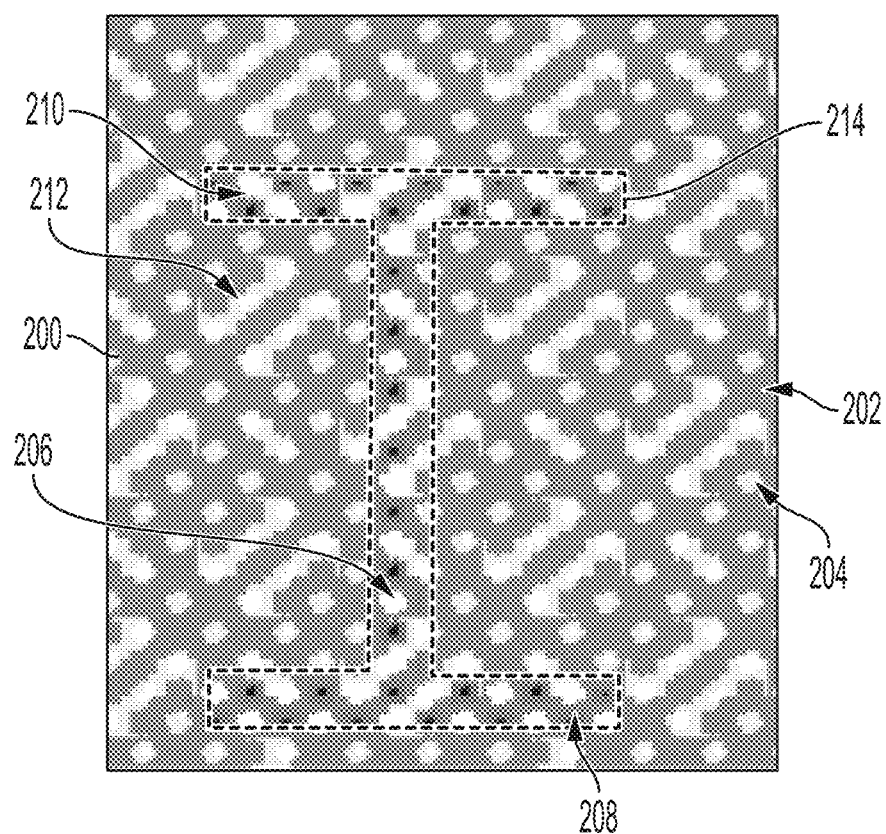

FIG. 2B is the same illustration as FIG. 2A with the first pattern 210 and the second pattern 212 distinguished from one another using a dash line area 214 added to FIG. 2B. As can be seen in FIG. 2B, the first pattern 210 shown in FIG. 2A is within the dash line area 214 and the second pattern shown in FIG. 2A is outside the dash line area 214. Note that the dash line area 214 added to FIG. 2B is not included in any printed document, but is only added to FIG. 2B to illustrate where the different areas 210, 212 are in FIG. 2A and help the reader of this document understand where items are located.

Again, as can be seen in FIGS. 2A and 2B, the first pattern 210 includes relatively lighter markings 204, non-printing patches 206, and optionally much darker printed dark marking patches 208 within the printed darker background 202. Similarly, FIGS. 2A and 2B show that the second pattern 212 includes only the relatively lighter markings 204, within the printed darker background 202, and does not include the non-printing patches 206, or the much darker printed dark marking patches 208.

As noted above, methods herein determine the minimum scanner resolution of a scanner that will be used in a copy operation for the original 200, set a first spacing interval at or above the minimum scanner resolution, and establish the first and second patterns 210, 212 to include the relatively lighter markings 204 within the relatively darker background 202, where the relatively lighter markings 204 are established to appear at the first spacing interval (e.g., an above-minimum scanner resolution spacing interval). The relatively darker background 202 is the same beneath the first and second patterns 210, 212 (e.g., the relatively darker background 202 has the same color, pattern shape, pattern frequency, etc., in the first and second patterns 210, 212).

As noted above, to further aid in matching the appearance of the relatively lighter markings 204 and the exposed print media showing through the non-printing patches 206, the process of establishing the first pattern 210 can optionally include the dark marking patches 208. As can be seen in FIGS. 2A and 2B, these dark marking patches 208 can have the same pattern that matches the pattern of the non-printing patches 206 (e.g., the uppercase letter I shape of area 214). However, such dark marking patches 208 are offset from (uniformly and consistently spaced from) the non-printing patches 206 so as to not block the non-printing patches 206 and allow areas of the underlying print media to remain exposed through the non-printing patches 206. Therefore, the dark marking patches 208 similarly can be spaced at or above the first spacing interval. There can be, for example, a one-to-one occurrence of the non-printing patches 206 and dark marking patches 208 such that each non-printing patch has a corresponding marking patch that does not block the non-printing patch but is spaced close enough to the non-printing patch to compensate for any color variation the non-printing patch may generate within the first and second patterns 210, 212. In other embodiments, the non-printing patches 206 may not be used, may be more frequent, or less frequent, relative to the non-printing patches 206.

Such dark marking patches 208 can even be relatively darker than the relatively darker background 202 in order to help compensate for any differences between the color of the underlying print media and the color of the relatively lighter markings 204. In other words, because of the close proximity of (and the matching spacing patterns of) the dark marking patches 208 and the non-printing patches 206, the dark marking patches 208 darken the appearance of the non-printing patches 206, without covering the non-printing patches 206. Therefore, when viewed by an observer under white light and without magnification, the small feature size and close spacing of the relatively lighter markings 204, the non-printing patches 206, and the dark marking patches 208 causes all such features to merge together and appear as a consistent, uniform lightening feature within the relatively darker background 202. Therefore, under white light and without magnification the relatively lighter markings 204, the non-printing patches 206, and the dark marking patches 208 do not appear distinct from the relatively darker background 202, but instead only make the relatively darker background 202 appear a little lighter.

Figure 3:
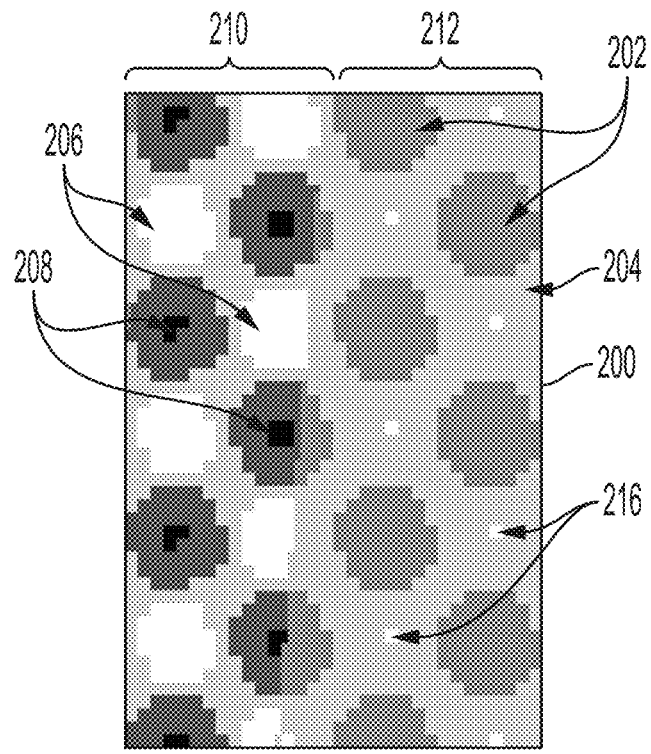

FIG. 3 illustrates a magnified portion of the original 200 shown in FIGS. 2A-2B. As can be seen in FIG. 3, the relatively darker background 202, the relatively lighter markings 204 in the second pattern 212, the non-printing patches 206 in the first pattern 210, and the dark marking patches 208 in the first pattern 210 can be included to hide the security feature in white light, but allow the security feature to be easily seen in UV light. Additionally, FIG. 3 illustrates compensating non-printing areas 216 that can be included in the second pattern 212 to help balance the color appearance between the first and second patterns 210, 212 when viewed in white light. Note that, in some situations, the compensating non-printing areas 216 may be sized below the minimum resolution of the scanner and may not be reproduced in the copy.

Again, scanners are able to detect printed marks (light relatively lighter markings 204) that are spaced at or above the scanner's minimum resolution (e.g., at or above the scanners MTF (modulation transfer function) or maximum frequency). These relatively lighter markings 204 are spaced at or above the scanner's minimum resolution (or at or above the scanners MTF) and therefore, the scanner does distinguish these relatively lighter markings 204 and the non-printing patches 206 from the darker background 202, and these relatively lighter markings 204 print as distinct features within the darker background 202 on the copy 220 of the original 200.

Figure 4A:
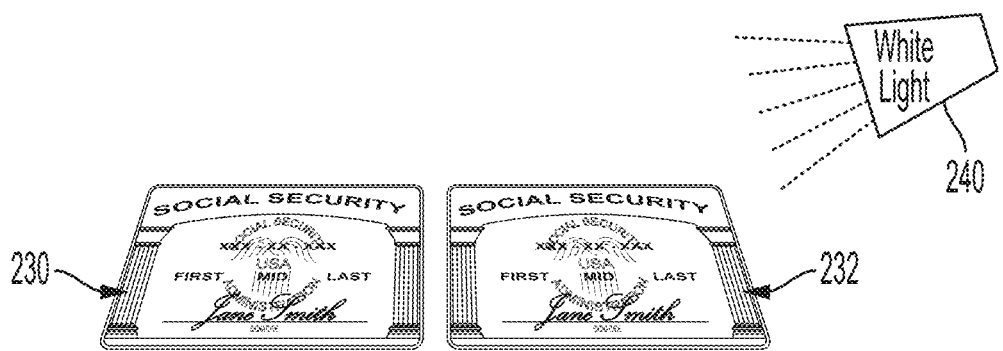

FIG. 4A illustrates that when an original 230 (social security card, in this example) and a copy 232 of the original 230 are exposed to white light 240, the unmagnified original 230 and copy 232 do not show any difference between the first and second patterns.

Figure 4B:
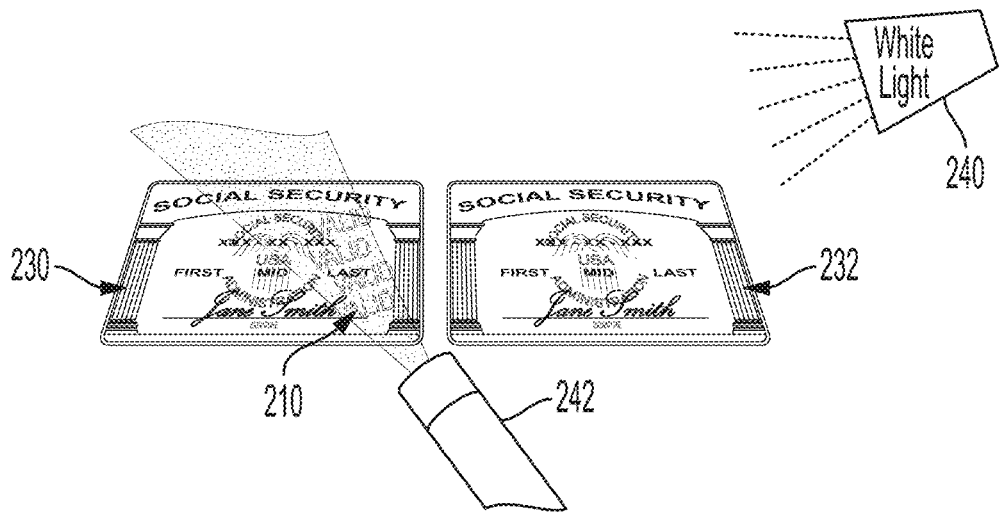
Figure 4C:
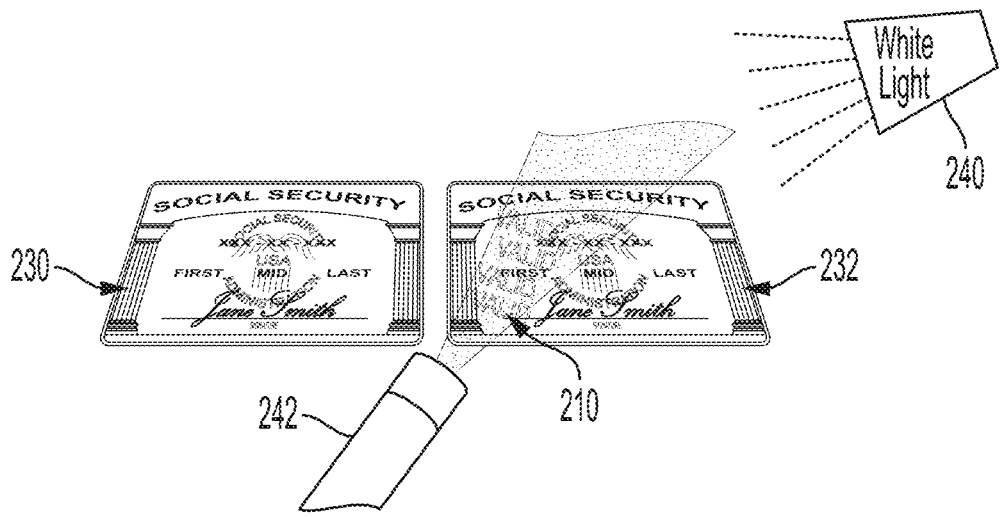

However, FIG. 4B illustrates that when the original 230 is exposed to ultraviolet light 242, the unmagnified original 230 does show a difference between the first and second patterns. Here, the first pattern 210 is in the shape of a word "VALID" to produce a message to the user that the original 230 is valid. FIG. 4C illustrates that the same message appears on the copy 232 when the ultraviolet light 242 is shown on the copy 232. The security printing feature can include other text, languages, symbols, shapes, etc., and the English language word "VALID" is merely used here as a non-limiting example. Note that while FIGS. 4B-4C show the text fluorescing brighter than the background, the patterns could be switched and the background could be brighter, with the text or graphics being darker than the background.

Therefore as shown in FIGS. 2A-4C, the difference between the first and second patterns 210, 212 (e.g., specifically the non-printing patches 206 in the first pattern 210) forms a metameric mark or user message (e.g., VALID in this example) that can be recognized by the observer or camera under ultraviolet lighting conditions 242 without magnification. The non-printing patches 206 can be the same size as the relatively lighter markings 204 and the print media color is close to the color of the relatively lighter markings 204, making the non-printing patches 206 and the relatively lighter markings 204 indistinguishable without magnification under white light 240.

Again, the relatively lighter markings 204 and non-printing patches 206 are small enough and closely spaced enough to not appear distinct within the darker background 202 to an observer or camera viewing the original 230 or copy 232 without magnification in white light 240; but instead the relatively lighter markings 204 and non-printing patches 206 merely lighten the shade of the darker background 202 to such a viewer. In other words, the darker background 202 and the closely spaced relatively lighter markings 204 and non-printing patches 206 merge to appear as a uniform shaded area of the original 230 and copy 232 to an observer or camera viewing the original 200 in white light without magnification (as shown in FIGS. 4A-4C).

In other words, locations 214 where the original 230 and copy 232 lack markings (e.g., 206) can be thought of as "holes" or missing relatively lighter markings 204 in the otherwise continuous area of the relatively darker background 202 because no marking material (ink or toner) will cover the first sheet of print media at the non-printing patches 206, allowing the print media to fluoresce in response to the ultraviolet light only where such non-printing patches 206 exist (within the region covered by the relatively darker background 202).

The ultraviolet light 242 reflecting from the ink or toner will mostly show just light and dark areas of violet to humans, without much distinction between different colors (other than some difference between light and dark colors of ink/toner). However, the elevated florescent characteristic of print media will fluoresce ultraviolet light 242 much more than ink or toner (because standard inks and toners do not contain large amounts of florescent material). Therefore, the difference between the first pattern 210 which has exposed areas of print media (non-printing patches 206); and the second pattern 212, which does not have exposed areas of the underlying print media in the same location 214, is easily seen when the original 230 and copy 232 are exposed to ultraviolet light 242 in FIGS. 4B-4C because the non-printing patches 206 in the first pattern 210 fluoresce greatly relative to the ink/toner in non-missing relatively lighter markings 204 the second pattern 212.

Again, the relatively lighter markings 204 have a color more similar to the sheets of media used to print the original 230 and the copy 232, relative to the relatively darker background 202. Therefore, when the original 230 and the copy 232 are exposed to white light 240 in FIGS. 4A-4C, the relatively lighter markings 204 appear the same as the non-printing patches 206 to an observer or camera (and all such items merge together when viewed to merely lighten the overall appearance of the relatively darker background 202).

Figure 5A:
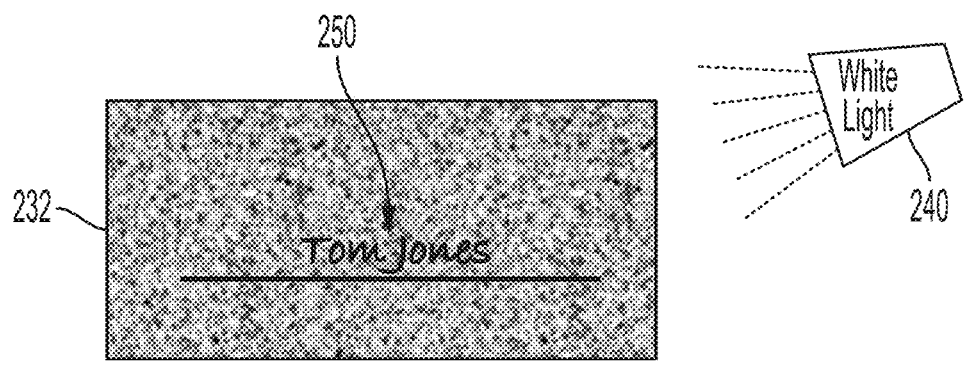
Figure 5B:
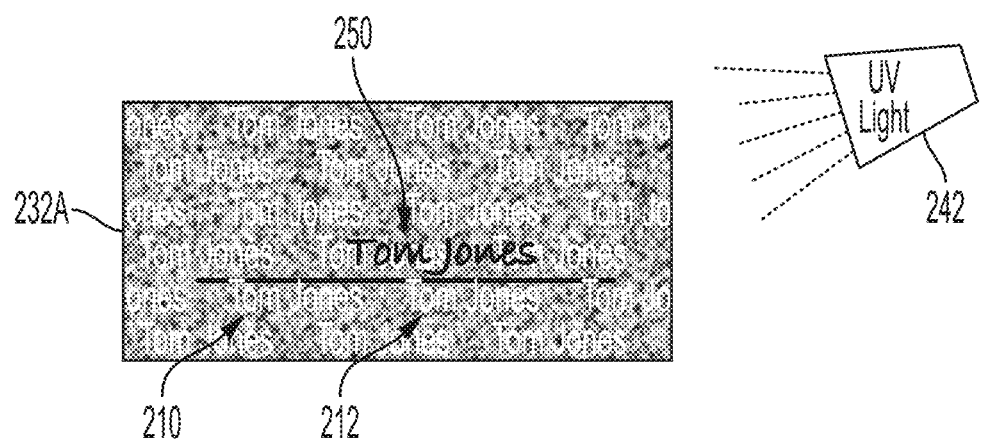
Figure 5C:
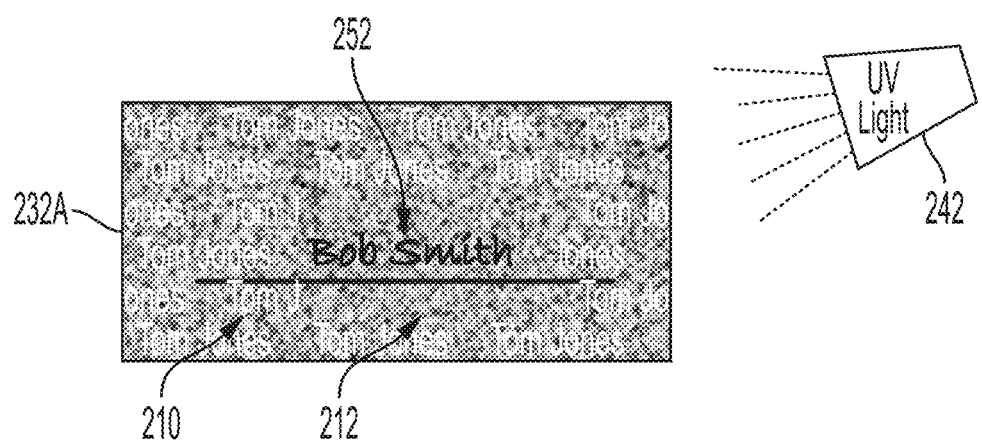

As shown in FIGS. 5A-5C, the security features herein can also optionally distinguish a genuine copy (a copy of the original that lacks any alteration) from an altered copy. Specifically, FIG. 5A illustrates a copy 232 of an original with a signature 250 (Tom Jones) viewed in white light 240, which does not reveal any hidden security features, as discussed above.

In some options herein, the security printing can be included as a regular uninterrupted pattern in all areas of the original and copy. In other options, the hidden security feature can include data from the original (e.g., a number, name, etc., from the original) allowing one to match the data in the hidden security feature with the non-hidden data on the copy. This is shown in FIG. 5B, which illustrates a genuine copy 232A viewed under ultraviolet light 242. As can be seen in FIG. 5B, the first pattern 210 forms a regular uninterrupted pattern of the hidden security feature (e.g., repeating the signed name "Tom Jones" with consistent sized letters, consistent spacing between words, consistent repetitious patterns, etc.) when the non-printing patches fluoresce (and, again, the second pattern 212 does not fluoresce).

Because of this regular uninterrupted pattern of the hidden security feature, any physical or electronic "cutting and pasting" that substitutes a portion from a document other than the original into the copy 232 will disturb the regular uninterrupted pattern of the hidden security feature. Such a disturbance 218 in the regular uninterrupted pattern of the hidden security feature (first pattern 210) reveals that the copy 232B shown in FIG. 5C has been altered relative to the original signature Tom Jones which has been replaced with an altered signature 252 (Bob Smith). More specifically, as shown in FIG. 5C, when the altered copy 232B is viewed under ultraviolet light 242, the disturbance 218 in the regular uninterrupted pattern of the hidden security feature (repetition of "Tom Jones") demonstrates that the altered copy 232B is no longer genuine, but is instead an altered copy 232B. Additionally, FIG. 5C illustrates that the hidden security feature can include data from the original (e.g., Tom Jones from the original) allowing one to match the data (Tom Jones) in the hidden security feature with the non-hidden data on the copy and revealing an altered copy where the signed name Bob Smith does not match the data (Tom Jones) in the hidden security feature. Therefore, embodiments herein can optionally distinguish between genuine copies 232A and altered copies 232B by using a regular uninterrupted pattern of the hidden security feature and including data from the original within the regular uninterrupted pattern of the hidden security feature.

Figure 6:
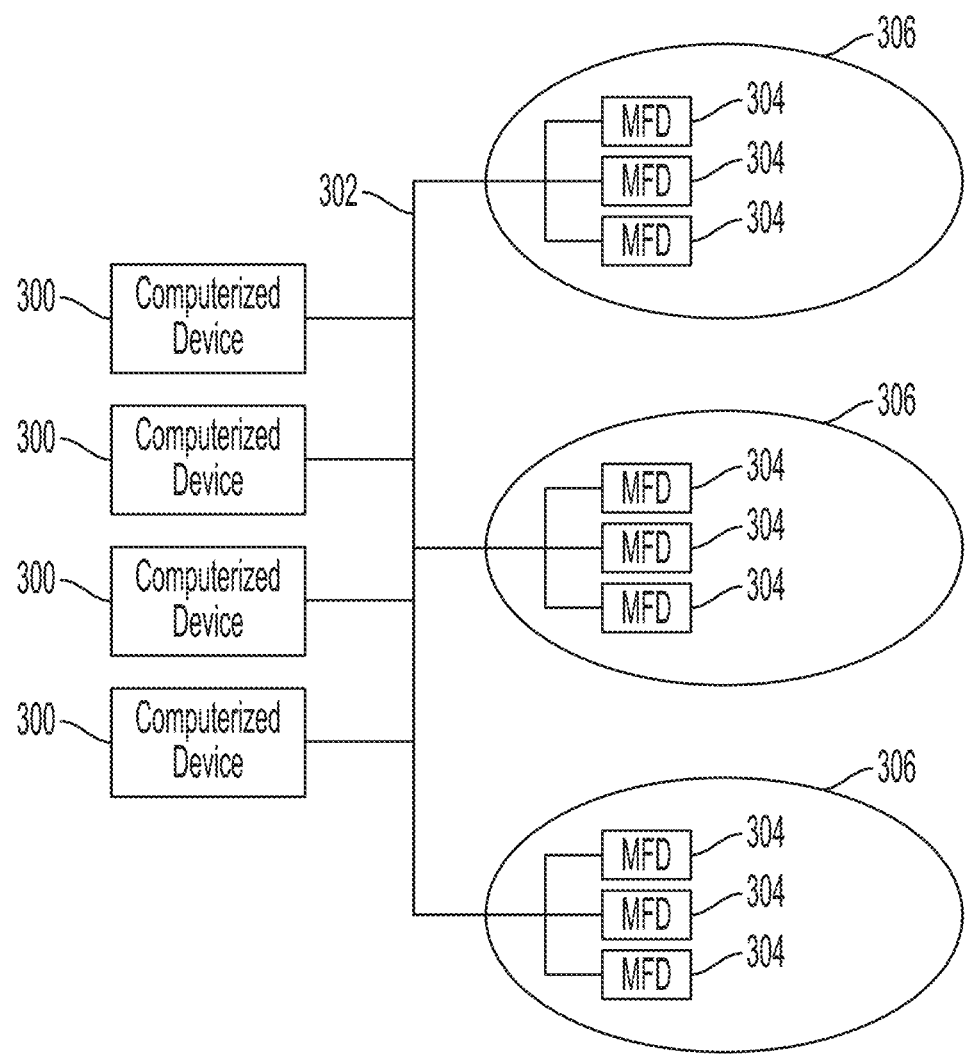
FIG. 6 is a schematic diagram illustrating systems herein.

As shown in FIG. 6, exemplary systems and methods herein include various computerized devices 300, 304 located at various different physical locations 306. The computerized devices 300, 304 can include print servers, printing devices, personal computers, etc., and are in communication (operatively connected to one another) by way of a local or wide area (wired or wireless) network 302.

Figure 7:
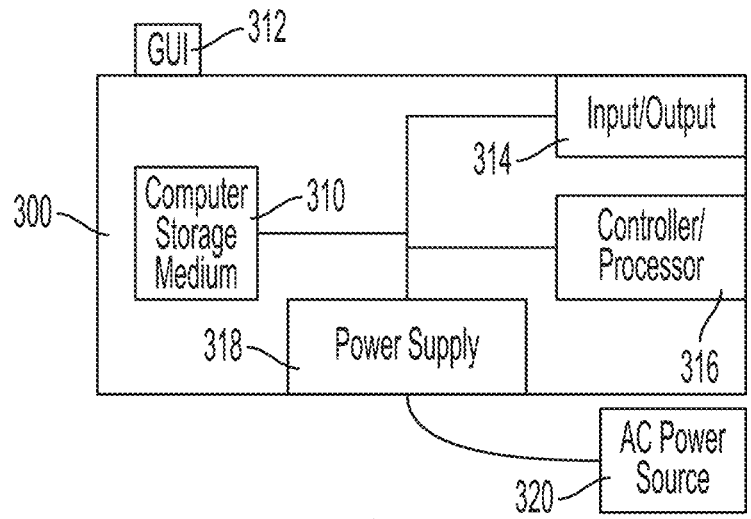
FIG. 7 is a schematic diagram illustrating a computerized device herein.

FIG. 7 illustrates a computerized device 300, which can be used with systems and methods herein and can comprise, for example, a print server, a personal computer, a portable computing device, etc. The computerized device 300 includes a controller/tangible processor 316 and a communications port (input/output) 314 operatively connected to the tangible processor 316 and to the computerized network 302 external to the computerized device 300. Also, the computerized device 300 can include at least one accessory functional component, such as a graphical user interface (GUI) assembly 312. The user may receive messages, instructions, and menu options from, and enter instructions through, the graphical user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 7, a body housing has one or more functional components that operate on power supplied from an alternating current (AC) source 320 by the power supply 318. The power supply 318 can comprise a common power conversion unit, power storage element (e.g., a battery, etc.), etc.

Figure 8:
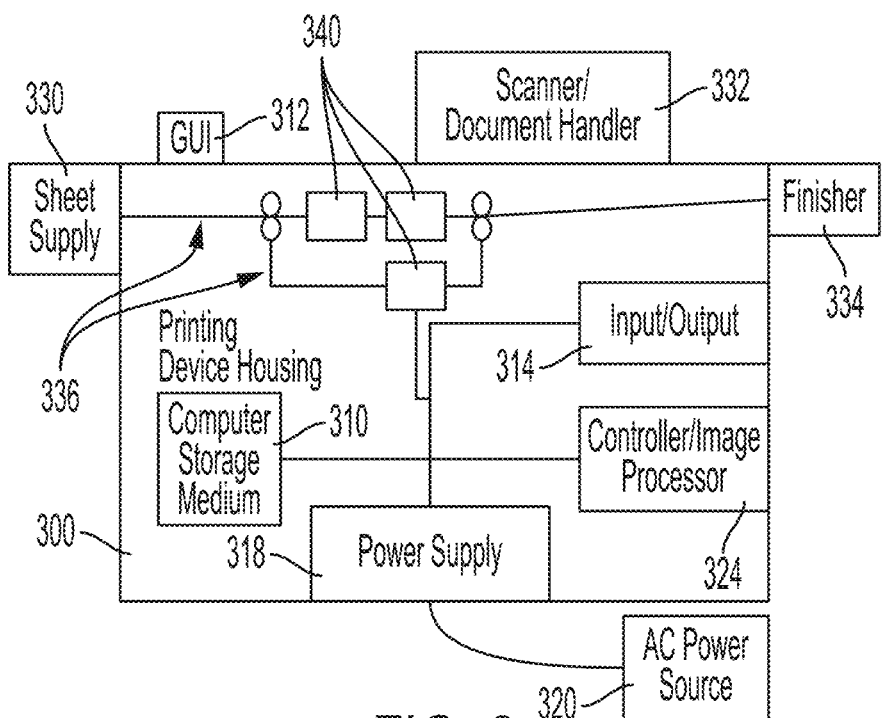
FIG. 8 is a schematic diagram illustrating a printing device herein.

FIG. 8 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that is different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing engines 340 are intended to illustrate any marking device that applies a marking material (toner, inks, etc.) to continuous media or sheets of media, whether currently known or developed in the future and can include, for example, devices that use a photoreceptor belt or an intermediate transfer belt, or devices that print directly to print media (e.g., inkjet printers, ribbon-based contact printers, etc.).

Therefore, as shown above systems described herein include (among other components) a processor 316, 324, a printer 304 operatively connected to the processor 316, 324, a scanner 332, configured to scanning sheets output by the printer 304, an ultraviolet light source 242 configured to illuminating sheets output by the printer 304, a white light source 240 configured to illuminating sheets output by the printer 304, etc.

The scanner 332 is configured to scan sheets output by the printer 304, etc. The processor 316, 324 is automatically configured to add the first and second patterns 210, 212 to a document; and to control the printer 304 to print an original 230 by printing a first pattern 210 within a second pattern 212 in the document on a first sheet of print media. The first pattern 210 and the second pattern 212 automatically generated by the processor 316, 324 include relatively lighter markings 204 within a relatively darker background 202. The relatively lighter markings 204 automatically generated by the processor 316, 324 occur at a first spacing interval, and the first pattern 210 is automatically generated by the processor 316, 324 to differ from the second pattern 212 by including non-printing patches 206 between the relatively lighter markings 204. These non-printing patches 206 are not included in the second pattern 212 when such is automatically generated by the processor 316, 324. These non-printing patches 206 can be the same size as the relatively lighter markings 204.

When the original 230 is scanned to produce a scanned image, the scanner 332 is capable of detecting patterns of markings at the first spacing interval. Therefore, this scanning causes the scanned image to distinguish the relatively lighter markings 204 and the non-printing patches 206 from the relatively darker background 202. Because of this, when the scanned image is printed on a second sheet of print media to produce a copy 232 of the original 230 using one of the printers 304, the copy 232 maintains distinct markings at locations 214 corresponding to where the relatively lighter markings 204 and the non-printing patches 206 appear in the original 230.

Further, when the original 230 is exposed to ultraviolet light 242, the first sheet of print media fluoresces the ultraviolet light 242 in locations 214 where the non-printing patches 206 are located in the original 230. Similarly, when the copy 232 is exposed to ultraviolet light 242, the copy 232 fluoresces the ultraviolet light 242 where the non-printing patches 206 appear in the original 230, again because the copy 232 maintains distinct markings at locations 214 corresponding to where the relatively lighter markings 204 and the non-printing patches 206 appear in the original 230.

More specifically, the ultraviolet light 242 fluoresces from locations 214 of the first sheet of print media where the non-printing patches 206 appear in the original 230, and this causes the first pattern 210 and the second pattern 212 to appear different from one another to an observer or camera when the original 230 is exposed to the ultraviolet light 242. In contrast, the locations 214 of the first pattern 210 and the second pattern 212 in the copy 232 appear the same to an observer or camera when the copy 232 is exposed to the ultraviolet light 242 (again because the copy 232 maintains distinct markings at locations 214 corresponding to where the relatively lighter markings 204 and the non-printing patches 206 appear in the original 230).

The process of establishing the first pattern 210 can include adding dark marking patches 208 to the first pattern 210, potentially in the same pattern as the non-printing patches 206, but where the dark marking patches 208 are offset from the non-printing patches 206. Also, the dark marking patches 208 are relatively darker than the relatively darker background 202. Further, the relatively lighter markings 204 have a color more similar to sheets of media used to print the original 230 and the copy 232, relative to the relatively darker background 202. Because of this, when the original 230 is exposed to the white light 240, the relatively lighter markings 204 appear the same as the non-printing patches 206 in the original 230 to an observer or camera. Similarly, because the first and second patterns 210, 212 are not filtered by the scanner 332, when the copy 232 is exposed to the white light 240, the area of the relatively lighter markings 204 appears the same as area 214 of the non-printing patches 206 to an observer or camera.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A method comprising:
    printing an original using a printer by printing a first pattern and a second pattern on print media,
    wherein the first pattern and the second pattern include relatively lighter markings within a relatively darker background,
    wherein the relatively lighter markings occur at a first spacing interval,
    wherein the first spacing interval is at or above a minimum scanner resolution of a scanner,
    wherein the first pattern differs from the second pattern by including non-printing patches between the relatively lighter markings,
    wherein the non-printing patches are not included in the second pattern,
    wherein, when the original is scanned to produce a scanned image using the scanner, the scanning causes the scanned image to distinguish the relatively lighter markings and the non-printing patches from the relatively darker background,
    wherein, when the scanned image is printed on the print media to produce a copy of the original using a printer, the copy maintains distinct markings at locations corresponding to where the relatively lighter markings and the non-printing patches appear in the original, and
    wherein, when the original and the copy are exposed to ultraviolet light, the print media fluoresces the ultraviolet light in locations where the non-printing patches are located.

2. The method according to claim 1, wherein the ultraviolet light fluoresces where the non-printing patches appear to cause the first pattern and the second pattern to appear different from one another to an observer when the original and the copy are exposed to the ultraviolet light.

3. The method according to claim 1, wherein locations of the first pattern and the second pattern appear the same to an observer when the original and the copy are exposed to white light.

4. The method according to claim 1, wherein the original includes dark marking patches in the same pattern as the non-printing patches and offset from the non-printing patches, and wherein the dark marking patches are relatively darker than the relatively darker background.

5. The method according to claim 1, wherein the non-printing patches display a regular uninterrupted pattern of a hidden security feature when the original and the copy are exposed to the ultraviolet light, and wherein disturbances of the regular uninterrupted pattern when the copy is exposed to the ultraviolet light reveals an altered copy.

6. The method according to claim 5, further comprising including data from the original within the regular uninterrupted pattern of the hidden security feature.

7. The method according to claim 1, wherein the relatively darker background is the same in the first pattern and the second pattern.

8. A method comprising:
determining a minimum scanner resolution of a scanner;
setting a first spacing interval at or above the minimum scanner resolution;
establishing a first pattern and a second pattern, wherein the first pattern and the second pattern include relatively lighter markings within a relatively darker background, wherein the relatively lighter markings are established to appear at the first spacing interval, wherein the first pattern is established to differ from the second pattern by having non-printing patches between the relatively lighter markings, wherein the second pattern is established to not include the non-printing patches, and wherein the non-printing patches are the same size as the relatively lighter markings;
adding the first pattern and the second pattern to a document; and
printing the document as an original on print media using a printer,
wherein, when the original is scanned to produce a scanned image using the scanner, the scanning causes the scanned image to distinguish the relatively lighter markings and the non-printing patches from the relatively darker background,
wherein, when the scanned image is printed on the print media to produce a copy of the original using a printer, the copy maintains distinct markings at locations corresponding to where the relatively lighter markings and the non-printing patches appear in the original, and
wherein, when the original and the copy are exposed to ultraviolet light, the print media fluoresces the ultraviolet light in locations where the non-printing patches are located.

9. The method according to claim 8, wherein the ultraviolet light fluoresces where the non-printing patches appear to cause the first pattern and the second pattern to appear different from one another to an observer when the original and the copy are exposed to the ultraviolet light.

10. The method according to claim 8, wherein locations of the first pattern and the second pattern appear the same to an observer when the original and the copy are exposed to white light.

11. The method according to claim 8, wherein the establishing the first pattern and the second pattern includes establishing dark marking patches in the first pattern, wherein the dark marking patches are in the same pattern as the non-printing patches and are offset from the non-printing patches, and wherein the dark marking patches are relatively darker than the relatively darker background.

12. The method according to claim 8, wherein the non-printing patches display a regular uninterrupted pattern of a hidden security feature when the original and the copy are exposed to the ultraviolet light, and
wherein disturbances of the regular uninterrupted pattern when the copy is exposed to the ultraviolet light reveals an altered copy.

13. The method according to claim 12, further comprising including data from the original within the regular uninterrupted pattern of the hidden security feature.

14. The method according to claim 8, wherein the relatively darker background is the same in the first pattern and the second pattern.

15. A system comprising:
a processor;
a printer operatively connected to the processor; and
a scanner configured to scan sheets output by the printer, wherein the scanner has a minimum scanner resolution,
wherein the processor is configured to control the printer to print an original by printing a first pattern within a second pattern on print media,
wherein the first pattern and the second pattern include relatively lighter markings within a relatively darker background,
wherein the relatively lighter markings occur at a first spacing interval that is at or above the minimum scanner resolution,
wherein the first pattern differs from the second pattern by including non-printing patches between the relatively lighter markings,
wherein the non-printing patches are not included in the second pattern,
wherein, when the original is scanned to produce a scanned image using the scanner, the scanning causes the scanned image to distinguish the relatively lighter markings and the non-printing patches from the relatively darker background,
wherein, when the scanned image is printed on the print media to produce a copy of the original using a printer, the copy maintains distinct markings at locations corresponding to where the relatively lighter markings and the non-printing patches appear in the original, and
wherein, when the original and the copy are exposed to ultraviolet light, the print media fluoresces the ultraviolet light in locations where the non-printing patches are located.

16. The system according to claim 15, wherein the ultraviolet light fluoresces where the non-printing patches appear to cause the first pattern and the second pattern to appear different from one another to an observer when the original and the copy are exposed to the ultraviolet light.

17. The system according to claim 15, wherein locations of the first pattern and the second pattern appear the same to an observer when the original and the copy are exposed to white light.

18. The system according to claim 15, wherein the original includes dark marking patches in the same pattern as the non-printing patches and offset from the non-printing patches, and wherein the dark marking patches are relatively darker than the relatively darker background.

19. The system according to claim 15, wherein the non-printing patches display a regular uninterrupted pattern of a hidden security feature when the original and the copy are exposed to the ultraviolet light, and
wherein disturbances of the regular uninterrupted pattern when the copy is exposed to the ultraviolet light reveals an altered copy.

20. The system according to claim 19, wherein the processor is configured to include data from the original within the regular uninterrupted pattern of the hidden security feature.

\* \* \* \* \*